(12) United States Patent
Riesebosch

(10) Patent No.: US 8,021,028 B2
(45) Date of Patent: Sep. 20, 2011

(54) VEHICLE LIGHT

(75) Inventor: Scott Arthur Riesebosch, St. Catharines (CA)

(73) Assignee: CRS Electronics, Welland Ontario (CA)

( * ) Notice: Subject to any disclaimer, the term of this patent is extended or adjusted under 35 U.S.C. 154(b) by 325 days.

(21) Appl. No.: 12/257,923

(22) Filed: Oct. 24, 2008

(65) Prior Publication Data

US 2010/0103688 A1    Apr. 29, 2010

(51) Int. Cl.
*B60Q 1/44*   (2006.01)
(52) U.S. Cl. ........................ 362/478; 362/545
(58) Field of Classification Search ............... 362/478, 362/479, 493, 540, 544, 545, 549, 231, 249.02
See application file for complete search history.

(56) References Cited

U.S. PATENT DOCUMENTS

| 5,567,036 | A | 10/1996 | Theobald et al. | |
|---|---|---|---|---|
| 5,635,902 | A | 6/1997 | Hochstein | |
| 6,009,650 | A | 1/2000 | Lamparter | |
| 6,241,373 | B1 * | 6/2001 | Kelley et al. | 362/545 |
| 6,598,996 | B1 * | 7/2003 | Lodhie | 362/545 |
| 7,040,790 | B2 * | 5/2006 | Lodhie et al. | 362/545 |
| 7,175,320 | B1 | 2/2007 | Burgess | |
| 2003/0193815 | A1 * | 10/2003 | Mishimagi | 362/545 |

* cited by examiner

*Primary Examiner* — David V Bruce
(74) *Attorney, Agent, or Firm* — Bingham McCutchen LLP

(57) ABSTRACT

Lights for attachment to a vehicle including a first illuminating means directed substantially perpendicular to a surface plane of the light and a second illuminating means directed substantially parallel with the surface plane of the light. The second illuminating means may be mounted solely within a lower hemisphere of the light. The light may also include a covering hood.

21 Claims, 4 Drawing Sheets

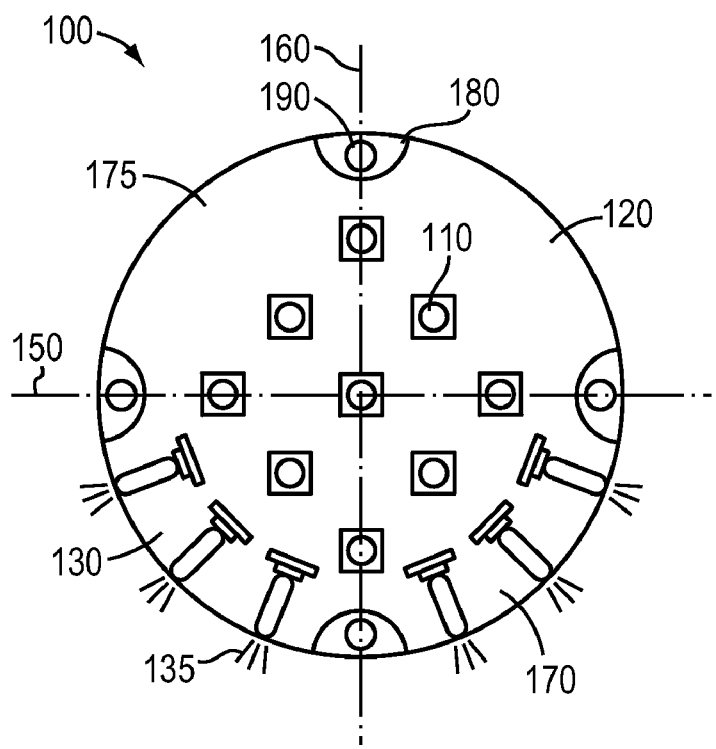
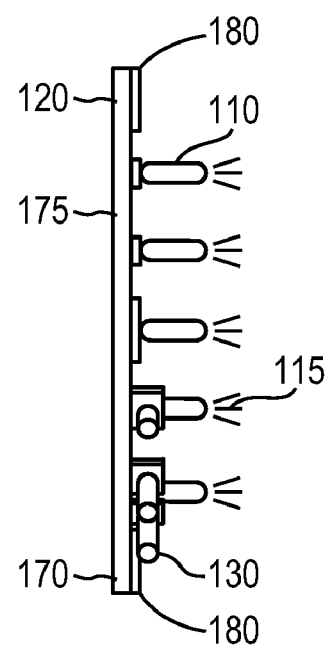
FIG. 1A    FIG. 1B
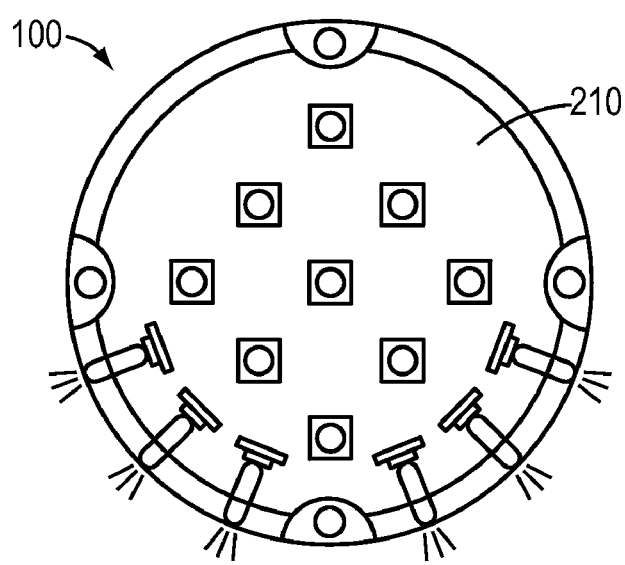
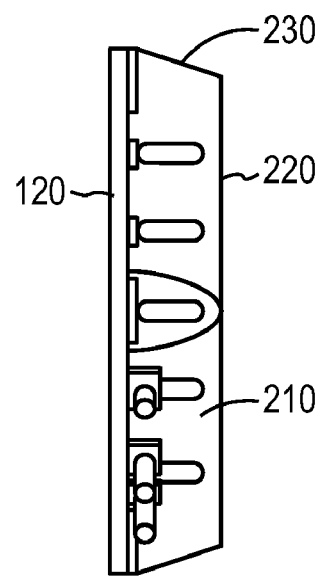
FIG. 2A    FIG. 2B

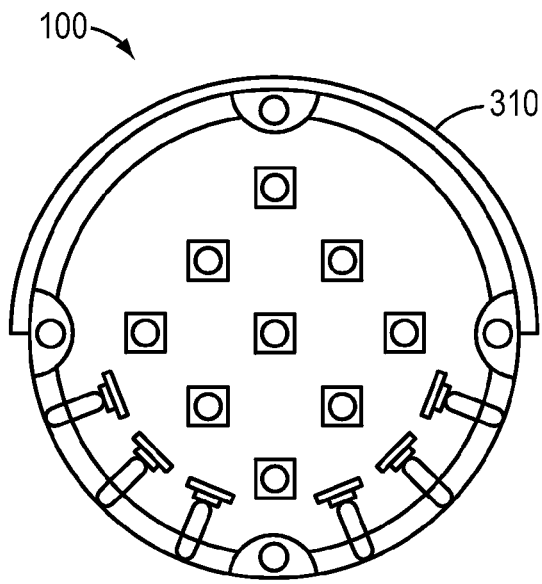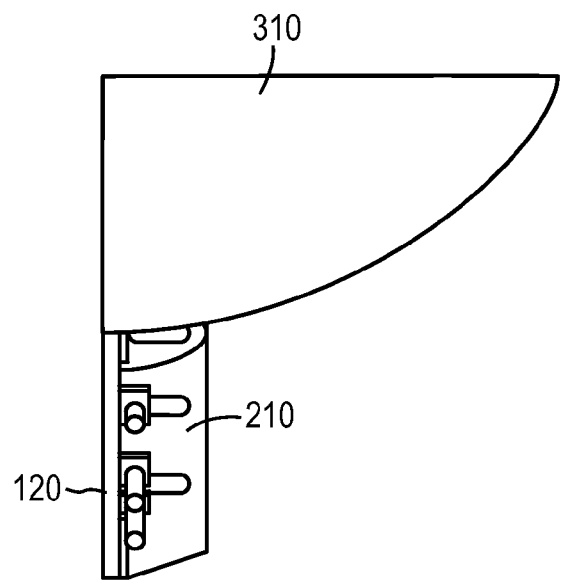
FIG. 3A  FIG. 3B
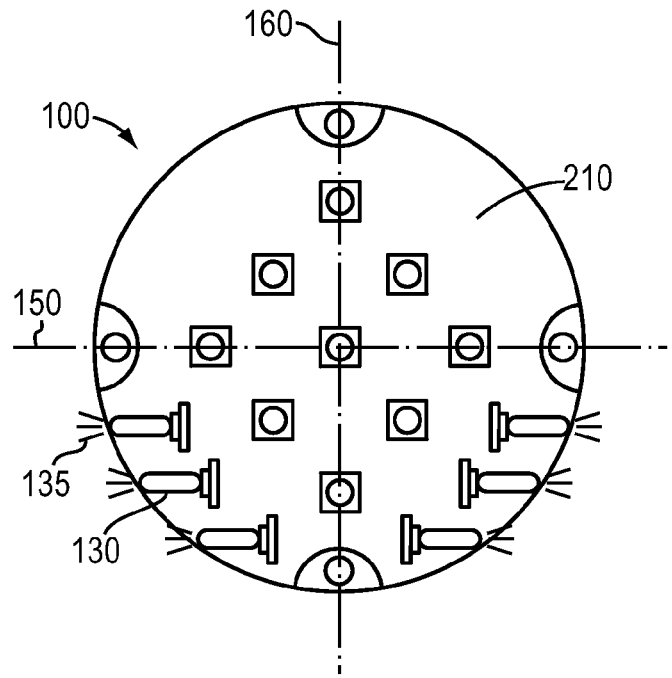
FIG. 4

VEHICLE LIGHT

TECHNICAL FIELD

In various embodiments, the invention relates to a light for a vehicle, and more particularly to LED-based safety lights.

BACKGROUND

Easily observable lighting systems for vehicles are important for safety—especially, for example, for buses or other passenger vehicles that make stops in high-traffic areas to pick up and drop off passengers. School buses, for example, make numerous stops during a trip to drop off and pick up children on their way to and from school, often during periods of reduced light.

Due to the sometimes unpredictable nature of children as they wait for or exit a school bus, a substantial safety hazard is posed during these times; oncoming and overtaking traffic may not be able to see children as they board and/or exit, or predict their movements. Although school buses employ flashing lights to alert traffic to the presence of children, the lights may not be visible from all angles. As a result, there is a need for improved methods and devices for alerting traffic to the presence and function of the bus during periods of reduced light.

SUMMARY OF THE INVENTION

In various embodiments, the present invention relates to improved systems and methods for providing a light source for a vehicle including illuminating elements directed both forward and to the side.

One aspect of the invention relates to a light having a base, at least one first illuminating element mounted to the base and directed substantially perpendicular to a surface plane of the base, and at least one second illuminating element mounted to the base and directed substantially parallel with the surface plane of the base. Each second illuminating element is mounted to a lower portion of the base.

In one embodiment, the light includes a covering hood extending around a portion of the base not including the lower portion thereof. Some or all of the first and/or second illuminating elements may be an LED, an incandescent bulb, a halogen bulb, a high intensity discharge bulb, or a fluorescent bulb. In one embodiment, the base is substantially circular and the second illuminating element comprises a plurality of LEDs arranged in an arcuate configuration along a lower peripheral half of the base. The plurality of LEDs may be arranged substantially symmetrically about a central vertical axis of the base. The light may include an optical cover over the illuminating elements.

In one embodiment, a plurality of second illuminating elements are directed substantially radially outwardly from a central portion of the base. At least one second illuminating element may be directed substantially parallel to a central horizontal axis of the base.

The base may mountable to a vehicle, and more particularly be mountable to a rear or front portion of a bus. The base may include circuitry for powering the illuminating elements. Power to the first illuminating element and the second illuminating element may be independently controlled, or be controlled collectively.

In one embodiment, the illumination field generated by the light illuminates a substantially 180° arc extending parallel to a central horizontal axis of the base. The illumination field may be substantially radially uniform. The first illuminating element and the second illuminating element may generate illumination of the same, or a different, color.

Another aspect of the invention includes a lighting system for a vehicle. The lighting system includes at least one light. The light includes a base mountable to a vehicle, at least one first LED mounted to the base and directed substantially perpendicular to a surface plane of the base, and at least one second LED mounted to the base and directed substantially parallel with the surface plane of the base. The at least one second LED is mounted only to a lower portion of the base.

In one embodiment, the lighting system includes means for connecting the at least one first LED and the at least one second LED to a power source. The base may include at least one mounting element. In one embodiment, the lighting system includes a covering hood extending around a portion of the base of the light not including the lower portion thereof These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 1A is an elevational view of an exemplary light in accordance with one embodiment of the invention;

FIG. 1B is a side elevation of the light illustrated in FIG. 1A;

FIG. 2A is an elevational view of the light of FIG. 1A including an optical cover, in accordance with one embodiment of the invention;

FIG. 2B is a side elevation of the light and optical cover illustrated in FIG. 2A;

FIG. 3A is an elevational view of a light with a covering hood, in accordance with one embodiment of the invention;

FIG. 3B is a side elevation of the light and covering hood of FIG. 3A;

FIG. 4 is an elevational view of another light, in accordance with one embodiment of the invention;

DESCRIPTION

Figure 5:
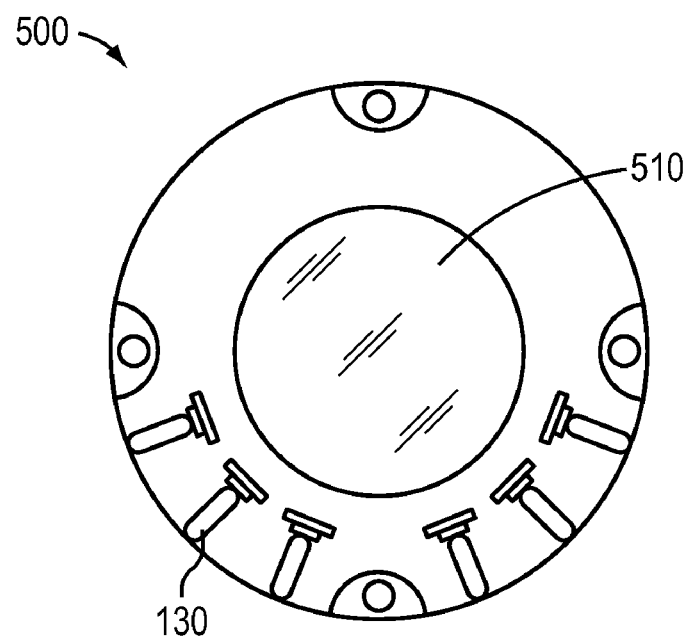
FIG. 5 is an elevational view of another light, in accordance with one embodiment of the invention.

In general, the present invention relates to vehicle lighting, and more particularly to a light for a vehicle that is adapted to provide illumination over a wide radius such as, for example, approximately 180° or more.

One embodiment of the invention includes a light for attachment to a vehicle, such as a bus or truck. The bus may, for example, be a school bus. The light is attached to a rear portion of the vehicle to provide rearward illumination, desirably over a radius of approximately 180° (i.e., over a rearwardly facing hemisphere centered at the light), thereby being visible to an observer to both the side and the rear of the vehicle. The light may be a brake light, an indicator light, and/or a warning light. For example, vehicles, and more particularly school buses, often utilize warning signals to alert motorists to the presence of passengers entering or exiting the vehicle, and to warn motorists that the vehicle is about to stop to pick up of drop off a passenger. Providing lights that generate an illumination field that is observable to the side as well as to the rear of a bus greatly increases the effectiveness of a light, for example, in warning motorists of vehicles passing the bus, and vehicles approaching the bus from an intersection.

In an alternative embodiment, the light may be located elsewhere on a vehicle (e.g. the front, side, roof, and/or underside of the vehicle). For example, the light may be attached to a front portion of a bus to provide forward illumination, again desirably over a radius of approximately 180°. More generally, the light may be placed on a stationary surface, such as a wall, or may take the form of a portable and/or handheld lighting element. Providing a light that generates an illumination field spanning a hemispherical radius may be beneficial in a wide range of applications, particularly those benefitting from a large illuminated field of view provided to an operator and/or observer.

In one embodiment, the light includes a base portion that is mountable to a vehicle. The base may be mounted using bolts, clips, adhesive elements, and/or any other appropriate mounting means. The base may also include a power coupling element, thereby allowing the light to be powered and controlled via a vehicle's electrical power system.

The light may include at least one first illuminating element directed substantially perpendicular to a surface plane of the base portion. The first illuminating element thereby provides directed illumination perpendicular to the surface plane of the base. The light also includes at least one second illuminating element directed substantially parallel with the surface plane of the base portion. The second illuminating element thereby provides illumination over a radial span centered substantially parallel with the surface plane of the base. As a result, the light provides illumination over a large solid angle, for example, up to at least 180°.

The light can be configured to emit illumination of any appropriate color including, but not limited to, red, amber, yellow, blue, and/or white, through the appropriate selection of illuminating elements and/or optical covering elements.

An exemplary light 100 including a plurality of first illuminating elements and a plurality of second illuminating elements is shown in FIGS. 1A and 1B. In this embodiment, the first illuminating elements include a plurality of first light-emitting diodes (LEDs) 110 mounted to a rigid base element 120 such that the illumination 115 from each first LED 110 is emitted in a direction substantially perpendicular to the surface plane of the base 120. The second illuminating elements include a plurality of second LEDs 130 mounted to a base element 120 and directed radially out from the center 140 of the base 120, such that the illumination 135 from each second LED 130 is emitted substantially radially direction along a plane parallel to the surface plane of the base 120. The second LEDs 130 are located in a lower portion (hemisphere 170) of the base 120, i.e. only around the outer edge of the base 120 below the central horizontal axis 150 of the base 120. The upper portion (hemisphere 175) of the base 120 does not include any second LEDs 130. The second LEDs 130 are symmetrically disposed on each side of a central vertical axis 160 of the base 120, such that a substantially identical illumination field is provided to each side of the central vertical axis 160. In an alternative embodiment, the second LEDs 130 are located asymmetrically to one side of the central vertical axis 160, with fewer or no second LEDs to the other side of the central vertical axis 160.

The illustrated light 100 includes nine first LEDs 110 arranged about the center 140 of the base 120, and six second LEDs 130 located in the lower hemisphere of the base 120 symmetrically to each side of the central vertical axis 160. Alternative embodiments may have a greater or smaller number of first LEDs 110 and/or second LEDs 130. The LEDs may be arranged in any appropriate pattern, which may be symmetric or asymmetric about one or more of the axes 150, 160. In one embodiment, the second LEDs 130 are mounted against, or close to, the outer edge of the base 120. In an alternative embodiment, at least some of the second LEDs 130 are mounted closer to the center 140 of the base 120.

The base 120 includes a plurality of mounting elements 180 to allow the light 100 to be releasably, or fixedly, mounted to a vehicle or other object. The mounting elements 180 may include holes 190 to allow bolts, clips, or other appropriate fastening means to be inserted therethrough to hold the base 120 to a surface. In an alternative embodiment, a greater or lesser number of mounting elements 180 may be incorporated into the light 100, and may be placed at any appropriate location on or around the base 120.

The first LEDs 110 and second LEDs 130 are typically mounted to a circuit board that is in turn mounted to the base element 120. The circuit board includes components that provide or conduct power to the first LEDs 110 and second LEDs 130 to turn the LEDs on and off, and in some embodiments, to control the strength of the illumination provided by the LEDs in response to a signal from a control element electrically (i.e., directly or wirelessly) coupled to the circuit board. The control element may be a switch operated by a driver of the vehicle, a sensor configured to turn the first LEDs 110 and/or second LEDs 130 on and off upon detection of a specific condition (e.g., ambient light below a threshold level), or may be any other appropriate control mechanism.

In one embodiment, the base 120 further includes one or more reflective elements to direct the light emitted by the illuminating elements. These reflective elements may include, for example, flat or curved mirrored surfaces placed between the LEDs and the base 120 to reflect any light emitted by the LEDs towards the base.

In one embodiment, the first LEDs 110 and second LEDs 130 may be powered by a single power source and/or control signal, such that all LEDs are turned on and off simultaneously. In an alternative embodiment, the first LEDs 110 and second LEDs 130 may be controlled independently, such that the first LEDs 110 may be turned on and off independently of the second LEDs 130, and vice versa. In one embodiment, individual LEDs, or groups of LEDs, may be controlled independently, allowing for numerous different combinations or illumination patterns. As a result, the light 100 can provide a plurality of different patterns of illumination such as, but not limited to, a flashing signal, a strobing signal, a directional signal (for example to only one side of the central vertical axis 160) and/or any other appropriate fluctuating or directed signal. For example, by allowing for the control of the second LEDs 130 to provide illumination separately to either side of the central vertical axis 160, the light 100 may function as a turn signal. In an alternative embodiment, the first LEDs 110 and second LEDs 130 are arranged such that, upon illumination of all or some of the first LEDs 110 and/or second LEDs 130, the light 100 displays an illuminated symbol or message.

In an alternative embodiment, LEDs are mounted at an angle to the surface plane of the base 120, and/or at an angle to the horizontal axis 150, to provide any desired directional configuration of illumination field. These angled LEDs may be mounted to the base in addition to, or in place off, the perpendicular and parallel mounted first LEDs 110 and second LEDs 130 described herein.

One embodiment of the invention includes an optical cover mounted to the light 100. An exemplary optical cover 210 is shown in FIGS. 2A and 2B. The optical cover 210 provides protection for the first illuminating elements and second illuminating elements, and the associated electronics. The optical cover includes a flat front portion 220 and an angled side portion 230, although it should be understood that the front portion 220 and the side portion 230 may be shaped and sized to fit over any configuration of illuminating elements and may be curved or flat, as appropriate. In one embodiment, the front portion 220 is curved to extend out from the base 120 to cover the illuminating elements without the need for an additional side portion 230.

The optical cover 210 may be releasably or fixedly mounted to the base 120. In an alternative embodiment, the optical cover 210 is mounted directly to the vehicle, or other body, to which the light 100 is mounted. The optical cover 210 may be mounted to the base 120 and/or vehicle by a connecting means including, but not limited to, a threaded connection, a clipped connection, an adhesive connection, or any other appropriate mode of forming a connection. The illustrated optical cover 210 includes indentations 240 allowing the optical cover 210 to mate with the mounting elements 180 on the base 120 of the light 100.

The optical cover 210 may be transparent or partially opaque, e.g., to allow illumination to be emitted from the light 100 in only certain directions. Thus, the optical cover 210 may be made from a partially transparent material that is configured to allow light of one frequency, or frequency range, to pass through the optical cover 210, while blocking light of all other frequencies. As a result, the light 100 may be configured to emit light of a given frequency by simply attaching an appropriately colored optical cover 210. This may, for example, allow the light 100 to be utilized to emit light of one color (e.g. red, amber, yellow, blue, white, or any other appropriate color) by simply fitting an appropriate optical cover 210. In one embodiment, different portions of the optical cover 210 are configured to allow different frequencies of light to pass therethrough, thereby allowing different regions of the light 100 to emit light of different colors.

The optical cover 210 may include a concave and/or convex lens portion to focus or disperse the light being emitted by the illuminating elements in certain directions. In one embodiment, the inner and/or outer surface of the optical cover 210 includes one or more indentations, gradations, or other geometrical surface features to affect the directionality of the light passing therethrough. For example, an inner surface of the optical cover 210 may include a plurality of curved or stepped surfaces configured to spread the light emitted by the illuminating elements to ensure that a substantially uniform level of light is emitted in all directions over the 180° radial span of the illumination field. In another embodiment, the light emitted by the illuminating elements may be of a substantially uniform level without the need for optical treatment by an optical cover 210.

One embodiment of the invention includes a covering hood 310 placed over at least a portion of the light 100, as shown in FIGS. 3A and 3B. The covering hood 310 may be used, for example, to block illumination emitted from the light 100 in certain directions, or to shield the emitted illumination from ambient light. The covering hood 310 may also provide a reflective surface to focus the illumination in certain directions, and/or provide protection for the light 100 from the elements.

The covering hood 310 is configured to extend around, and fit over, the upper hemisphere 175 of the light 100. The covering hood 310 may be mounted onto the base 120 of the light 100, and/or be mounted directly to a vehicle or other object to which the light 100 is mounted. The covering hood 310 may be releasably or fixedly mounted by any appropriate means including, but not limited to, threaded mounted elements, clips, rivets, and adhesive elements.

By placing the second LEDs 130 on only the lower hemisphere 170 of the light 100, all of the second LEDs 130 are located away from the covering hood 310. As a result, the covering hood 310 does not directly block the light emitted by any of the second LEDs 130. The covering hood 310 may be of any appropriate shape and size and may be constructed from any appropriate material, such as a metal and/or a plastic. The covering hood 310 may include an inner surface with a reflective or absorptive surface or coating.

In one embodiment, the covering hood 310 extends approximately 180° around the upper hemisphere 175 of the circumference of the light 100. The covering hood 310 extends symmetrically to each side of the central vertical axis 160 of the base 120 by approximately 90°. In an alternative embodiment, the covering hood 310 extends over a greater portion of the circumference of the light 100 (i.e. greater than 180°), or over a lesser portion of the circumference of the light 100 (i.e. less than 180°). In still another alternative embodiment, the covering hood 310 extends asymmetrically about the central vertical axis 160 of the base 120, such that the covering hood 310 covers a greater portion of one side of the circumference of the base 120 than the other. In each of these embodiments, any appropriate number of second LEDs 130 may be positioned on either side of the central vertical axis 160 to ensure that the second LEDs 130 extend over the portion of the base 120 uncovered by the covering hood 310. For example, one or more second LEDs 130 may be positioned in the upper hemisphere 175 of the base 120 to provide illumination from a portion of the upper hemisphere 175 of the base 120 not covered by a covering hood that spans less than the full 180° circumference of the upper hemisphere 175.

As shown in FIG. 4, the second LEDs 130 may be positioned such that their illumination 135 extends substantially parallel to the central horizontal axis 150 of the light 100. In alternative embodiments of the invention, the second LEDs 130 may be mounted to the base 120 in any appropriate orientation, thereby allowing the illumination from the second LEDs to span any appropriate radius and direction.

Typically, all of the first LEDs 110 and second LEDs 130 produce light of a single uniform color. But LEDs of multiple colors may be incorporated into the light 100, in any desired configuration. Other sources of illumination may be included in addition to, or in place of the LEDs. In one embodiment, one or more of the first LEDs 110 and/or second LEDs 130 are replaced by an alternative illumination source such as, but not limited to, an incandescent bulb, a halogen bulb, a high intensity discharge bulb, or a fluorescent bulb.

Thus, as shown in FIG. 5, the first illuminating element of a light 500 may be a single incandescent bulb 510, while the second illuminating element includes a plurality of second LEDs 130, as described above. In an alternative embodiment, a larger number of incandescent bulbs 510 can be used as the first illuminating element.

Figure 6:
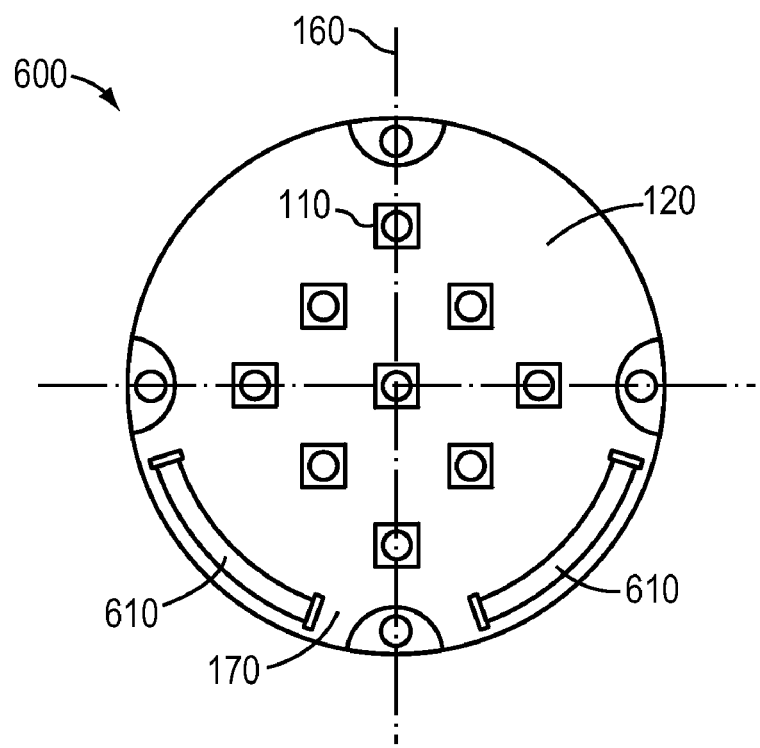
FIG. 6 is an elevational view of another light, in accordance with one embodiment of the invention.

FIG. 6 illustrates an embodiment in which the second illuminating element includes a pair of fluorescent bulbs 610 spaced symmetrically about the central vertical axis 160 in the lower hemisphere 170 of the light 700. The first illuminating element includes a plurality of first LEDs 110, as described above. In an alternative embodiment, a single fluorescent bulb can span the circumference of the lower hemisphere 170 of the light 700 to provide the second illuminating element. One or more reflective elements can be placed behind and/or around the fluorescent bulbs 610 to focus their illumination out from the light 700.

Although in the illustrated embodiments the base 120 of the light 100 is substantially circular in shape, the light may be configured in any of a variety of shapes including, for example, a circle, a square, a rectangle, an oval, a hexagon, an octagon, a D-shape, or any other appropriate geometrical shape.

Figure 7:
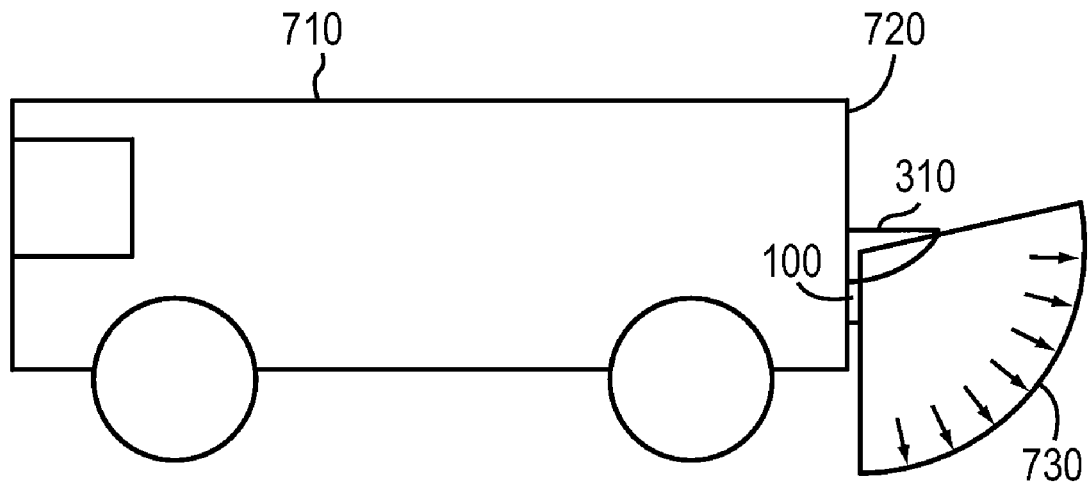
FIG. 7 is a schematic side view of a light mounted to the rear of a vehicle, in accordance with one embodiment of the invention.
Figure 8:
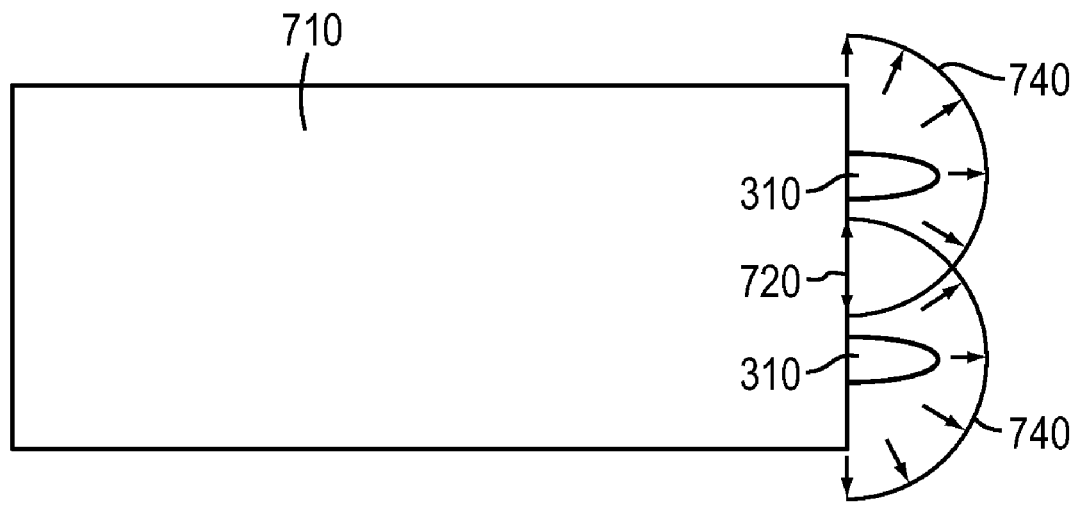
FIG. 8 is a schematic plan view of the light and vehicle of FIG. 7.

The lights described herein is typically attached to a vehicle. An exemplary vehicle 710 with a pair of lights 100 attached is shown in FIGS. 7 and 8. The lights 100 and covering hood 310 are positioned side by side on a rear portion 720 of a vehicle 710. The vertical plane of the illuminated field 730 generated by each light 100 depends upon the positioning of the covering hood 310 and the configuration of the first illuminating elements and second illuminating elements within the lights. However, as the second illuminating elements are positioned so as not to be covered by the covering hood 310, the horizontal plane of the illuminated field 740 generated by each light 100 may extend over a 180° span.

In one embodiment, by carefully locating and directing the first illuminating elements and second illuminating elements within the light, the light can be configured to produce an illuminated field that extends over any appropriate angle and has any appropriate strength and strength distribution. For example, the light can be configured to illuminate a horizontal field of greater than or less than 180°. In addition, the light can be configured to provide a substantially uniform illuminated field, or provide a directionally dependent illuminated field.

Having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A light comprising:
   a single planar base;
   at least one first illuminating element mounted to the base and directed substantially perpendicular to a surface plane of the base; and
   at least one second illuminating element mounted to the base and directed substantially parallel with the surface plane of the base, wherein the at least one second illuminating element is mounted to a lower portion of the base.

2. The light of claim 1, wherein at least one of the first illuminating element and the second illuminating element comprises one of an LED, an incandescent bulb, a halogen bulb, a high intensity discharge bulb, and a fluorescent bulb.

3. The light of claim 2, wherein the first illuminating element comprises a plurality of LEDs.

4. The light of claim 2, wherein the base is substantially circular and the second illuminating element comprises a plurality of LEDs arranged in an arcuate configuration along a lower peripheral half of the base.

5. The light of claim 4, wherein the plurality of LEDs are arranged substantially symmetrically about a central vertical axis of the base.

6. The light of claim 4, wherein the illumination field generated by the light illuminates a substantially 180° arc extending parallel to a central horizontal axis of the base.

7. The light of claim 6, wherein the illumination field is substantially radially uniform.

8. The light of claim 1, wherein a plurality of second illuminating elements are directed substantially radially outwardly from a central portion of the base.

9. The light of claim 1, wherein at least one second illuminating element is directed substantially parallel to a central horizontal axis of the base.

10. The light of claim 1, further comprising an optical cover over the illuminating elements.

11. The light of claim 1, wherein the base is mountable to a vehicle.

12. The light of claim 11, wherein the base is mountable to a rear or front portion of a bus.

13. The light of claim 1, wherein the base further comprises circuitry for powering the illuminating elements.

14. The light of claim 1, wherein the at least one first illuminating element and the at least one second illuminating element generate illumination of the same color.

15. A light comprising:
   A base comprising circuitry for powering illuminating elements;
   at least one first illuminating element mounted to the base and directed substantially perpendicular to a surface plane of the base; and
   at least one second illuminating element mounted to the base and directed substantially parallel with the surface plane of the base wherein (i) the at least one second illuminating element is mounted to a lower portion of the base, and (ii) power to the at least one first illuminating element and the at least one second illuminating element is independently controlled.

16. A light comprising:
   a base
   at least one first illuminating element, generating an illumination of a first color, mounted to the base and directed substantially perpendicular to a surface plane of the base; and
   at least one second illuminating element, generating an illumination of a second color, different from the first color, mounted to the base and directed substantially parallel with the surface plane of the base, wherein the at least one second illuminating element is mounted to a lower portion of the base.

17. A light comprising:
   a base;
   at least one first illuminating element mounted to the base and directed substantially perpendicular to a surface plane of the base;
   at least one second illuminating element mounted to the base and directed substantially parallel with the surface plane of the base, wherein the at least one second illuminating element is mounted to a lower portion of the base; and
   a covering hood extending around a portion of the base not including the lower portion thereof.

18. A lighting system for a vehicle comprising:
   at least one light comprising:
      a single planar base mountable to a vehicle;
      at least one first LED mounted to the base and directed substantially perpendicular to a surface plane of the base; and
      at least one second LED mounted to the base and directed substantially parallel to the surface plane of the base, wherein the at least one second LED is mounted only to a lower portion of the base.

19. The lighting system of claim 18, further comprising means for connecting the at least one first LED and the at least one second LED to a power source.

20. The lighting system of claim 18, wherein the base comprises at least one mounting element.

21. A lighting system for a vehicle comprising:
   at least one light comprising:
      a base mountable to a vehicle;
      at least one first LED mounted to the base and directed substantially perpendicular to a surface plane of the base;
      at least one second LED mounted to the base and directed substantially parallel to the surface plane of the base, wherein the at least one second LED is mounted only to a lower portion of the base; and
   a covering hood extending around a portion of the base not including the lower portion thereof.

* * * * *